United States Patent [19]
Collender

[11]   4,290,083
[45]   Sep. 15, 1981

[54] STEREOSCOPIC TELEVISION (UNAIDED) ON STANDARD BANDWIDTH-METHOD AND APPARATUS

[76] Inventor: Robert B. Collender, 709 Patterson Ave., Glendale, Calif. 91203

[21] Appl. No.: 107,838

[22] Filed: Dec. 28, 1979

[51] Int. Cl.³ .............................................. H04M 9/54
[52] U.S. Cl. .......................................... 358/88; 358/3; 358/231; 352/58
[58] Field of Search ..................... 358/88, 90, 92, 231, 358/236, 3, 2; 350/144, 3.5; 352/58

[56] References Cited

U.S. PATENT DOCUMENTS

| | | | |
|---|---|---|---|
| 3,292,491 | 12/1966 | Hourdiaus | 353/122 |
| 3,520,589 | 7/1970 | Angel et al. | 350/150 |
| 3,654,499 | 4/1972 | Smith | 307/304 |
| 3,763,480 | 10/1973 | Weiner | 340/173 R |
| 3,824,002 | 7/1974 | Beard | 350/342 |
| 3,866,209 | 2/1975 | Weiner | 340/784 |
| 3,976,826 | 8/1976 | Fulton, Jr. | 358/133 |
| 3,982,063 | 9/1976 | Brown et al. | 358/133 |
| 4,006,968 | 2/1977 | Ermstoff | 350/342 |
| 4,019,807 | 4/1977 | Boswell | 350/342 |
| 4,089,597 | 5/1978 | Collender | 352/53 |
| 4,113,367 | 9/1978 | Fritzler | 352/105 |
| 4,227,201 | 10/1980 | Grimberg et al. | 357/27 |
| 4,231,642 | 11/1980 | Collender | 352/58 |

*Primary Examiner*—Robert L. Richardson
*Assistant Examiner*—Edward L. Coles

[57] ABSTRACT

My invention relates to stereoscopic television using relative camera to scene translating motion and does not require optical aids at observer's eyes, presents a horizontal parallax (Hologram like) 3-D full motion scene to a wide audience, has no dead zones or pseudo 3-D zones over the entire horizontal viewing field and operates on standard broadcast television signals requiring no changes to the television studio equipment or the home television antenna. The only change required at the receiving end is a special television projector. The system is compatible with prerecorded standard color television signals. The cathode ray tube is eliminated by substituting an array of solid state charge couple device liquid crystal light valves which have the property to receive television fields in parallel from memory and which are arrayed in an arc for scanning purposes. The array contains a scrolled sequence of successive television frames which serve as the basis for 3-D horizontal viewing parallax. These light valves reflect polarized light with the degree of polarization made a function of the scene brightness. The array is optically scanned and the sequence rapidly projected onto a cylindrical concaved semi-specular and segmented screen that returns all of the light to a rapidly translating vertical "aerial" exit slit of light through which the audience views the reconstructed 3-D scene.

2 Claims, 12 Drawing Figures

STEREOSCOPIC TELEVISION (UNAIDED) ON STANDARD BANDWIDTH-METHOD AND APPARATUS

In order to view 3-D scenes using conventional television channel bandwidth, there must be a horizontal component of relative motion between camera and scene. Without this motion, the scenes will appear two dimensional as in standard television.

CROSS-REFERENCES TO RELATED APPLICATIONS

My new 3-D television invention utilizes the basic optical scanner and screen from my U.S. patent application Ser. No. 06/062,749, now U.S. Pat. No. 4,231,642 "Stereoscopic Motion Picture Circular to Linear Scan Translator—Method and Apparatus" but does not require film. My new invention scans an array of images generated from solid state charge coupled device liquid crystal light valves (CCDLCLV's) or the equivalent, arranged in an arc within a horizontal plane. In U.S. patent application Ser. No. 06/062,749, now U.S. Pat. No. 4,231,642 the picture surfaces are contained in the curved surface of a right circular cylinder. In addition, in my new invention, the input is a continuously changing set of N consecutive television frames of electronic standard television signals that are stored and accessed from either magnetic disc, tape or solid state memory sequentially in a scroll fashion through the image array. The frames are read into the charge couple device memories and then transferred in parallel to the liquid crystal readout image array. Thus the television images are exponentially fading after transfer due to the liquid crystal time constant but are scanned just following the transfer interval to assure a strong signal. The optical scanner is synchronized to the television signal. In my U.S. patent application Ser. No. 06/062,749, now U.S. Pat. No. 4,231,642 a continuously rotating image motion compensator mirror drum is required to stabilize the image of the continuously moving film. The mirrors were parallel to the rotation axis and the film was not synced to the scanner. In my new invention the rotating drum is replaced with "stationary" roof mirror facets at 45 degrees to the horizontal plane of the N-image array. This is possible because the N-image array is also stationary. In my U.S. patent application Ser. No. 06/062,749 now U.S. Pat. No. 4,231,642 the film traveled in one direction and performed correct 3-D image orientation and sequence for relative camera/scene motion in one direction. My new invention contains automatic sensing electronics for operating correctly on camera/scene motion in either direction.

BRIEF SUMMARY OF THE INVENTION

My invention consists of a new 3-dimensional television system that uses existing single channel television bandwidth and provides "Holographic like" 3-D without the need for observers to wear glasses and provides the facility that allows observers to "look around" spatial images.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind a rapidly moving optically generated vertical aerial exit slit, the parallax thus occuring prevents one eye of each observer from seeing what the other eye sees at any and every instant of time. The aerial exit slit being in motion, each eye sees a complete image within a short interval of time. I make this inverval within the persistence of vision for human observers. The brain fuses the two eye observations into a single stereoscopic view image, as my practical results predicate.

Considering my system in greater detail, the perspective that one eye of any observer sees is made up of discrete vertical lines of image information taken at discrete instants of time. At these same instants of time, the other eye of that observer sees a completely different perspective. The net perspective for the two eyes is different, of course, because the eyes are not coincident in space, but are spaced apart horizontally. Considering the image as an entity, it is disected in both time and space.

An object of my invention is to provide viewing of 3-dimensional television without the use of viewing aids at the eyes of the observers. Another object is to provide a stereoscopic system in which various perspectives of the scene viewed may be obtained by changing one's position around the stereoscopic television projector. Another object is to provide a basic stereoscopic television projector applicable to known and existing forms of image acquiring processes. Another object is to provide a means for reproducing stereoscopic television images that are relatively rugged and are suited to retain adjustment in practice. Other objects will become apparent upon reading the following detailed specification and upon examining the accompanying drawings, in which are set forth by way of illustration and example, certain embodiments of my invention.

DETAILED DESCRIPTION OF DRAWINGS

Figure 1:
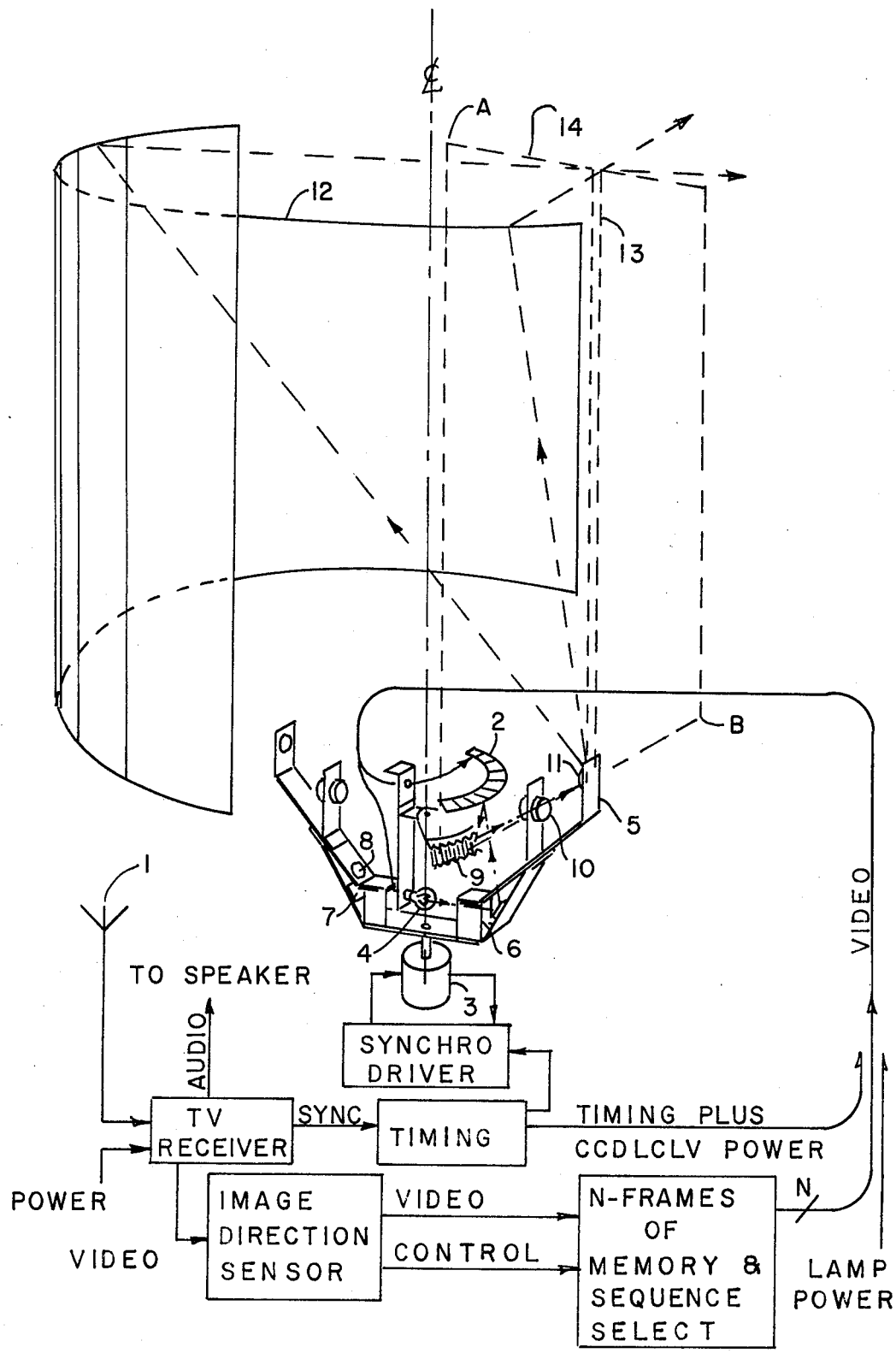
FIG. 1 shows a descriptive block diagram of an embodiment of my 3-D television system.
Figure 2A:
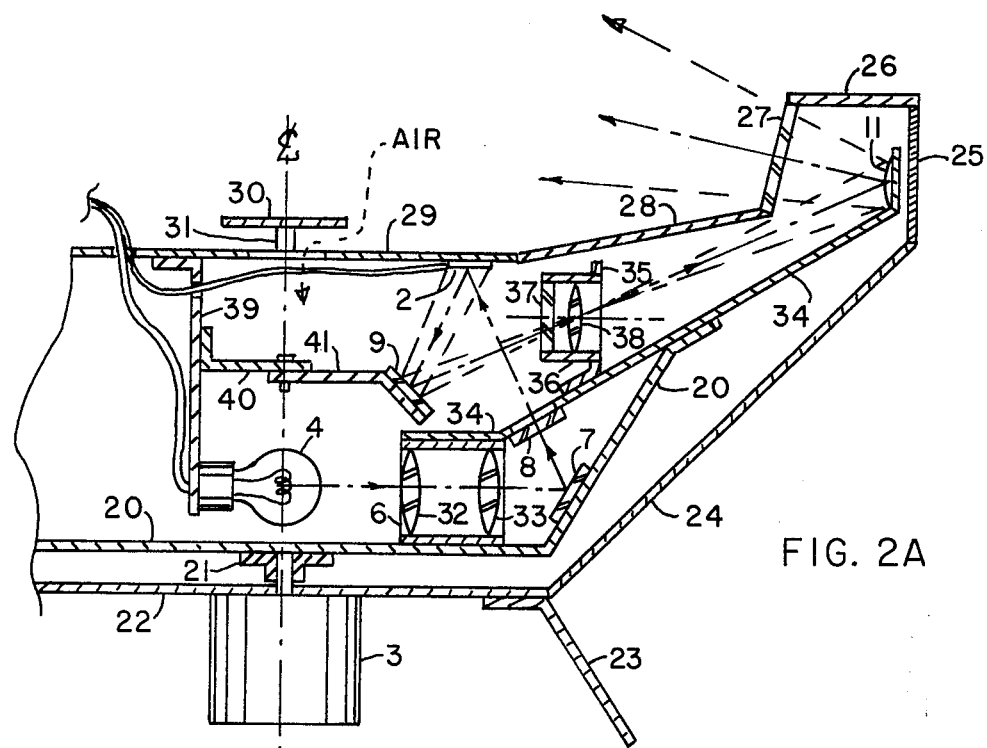
FIG. 2A shows a partial detailed cross sectional side elevation of the optical scanner in a selected embodiment of my invention.
Figure 2B:
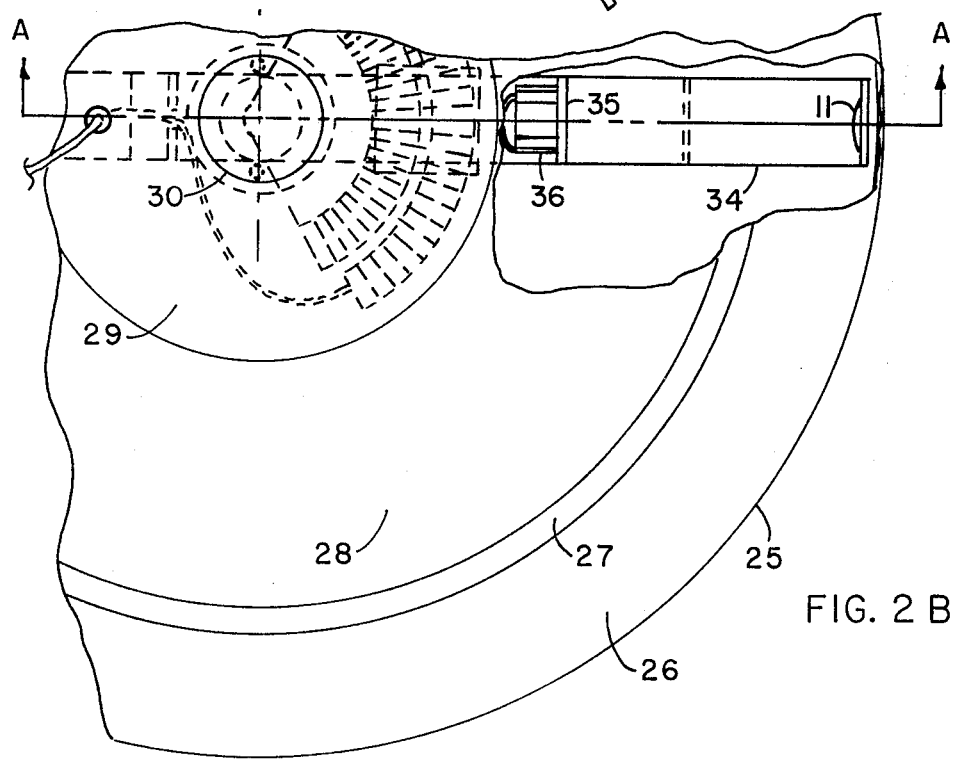
FIG. 2B shows a partial plan view of the optical scanner according to an embodiment of my invention and delineation of a sectional boundary which FIG. 2A provided in side elevation.

FIG. 1 shows a perspective of one embodiment of my 3-D TV receiving set invention and introduces the main elements in the system. Details and possible variations in the embodiment are described using subsequent figures. In FIG. 1, the standard television signal is received by conventional antenna 1 and sent to a TV receiver where the desired RF channel is selected and coverted to audio for driving a conventional loud speaker; horizontal and vertical sync signals are generated to control the timing for the individual Charge Couple Device Liquid Crystal Light Valve (CCDLCLV) TV frame modulators in the 120 degree arc radial array 2 (described in U.S. patent references to follow) and provide synchronization reference signals to motor 3; video is provided for the image direction sensor shown in FIG. 7 and FIG. 8 where the right or left sequential loading of subsequent TV frames into the array of CCDLCLV's 2 is determined. Video for N-successive frames (where N is later shown to be 24), related timing and power for the stationary array of CCDLCLV's plus power for the stationary projection lamp 4 is carried by wire from the source to those stationary components. Scanner 5 is connected to synchronous motor 3 and rotates at 1800 rpm (30 r/s and in sync with the TV sync pulses). Scanner 5 is symmetrical about its rotation axis and contains condensing lens assembly 6, mirror 7, polarizer 8, a stationary conical array of "N" 90 degree roof mirrors 9 arranged in an arc under the 120 degree arc array of CCDLCLV's 2, an analyzer and projection lens assembly 10 and an aspherical reflector 11. Details of the scanner assembly are shown in FIG. 2A and FIG. 2B. Light from lamp 4 is condensed by condenser lens assembly 6, reflects from a mirror similar to mirror 7 in symmetry (shown on the opposite side of the scanner) passes through a polarizer similar to 8 reflects from the CCDLCLV array 2 and then reflects from the array of N roof mirrors 9 and passes through the assembly of analyzer and projection lens 10 and reflects from aspheric mirror 11 to the semi-specular and segmented screen 12 described in detail in FIG. 3 and text and in more detail in my U.S. patent application Ser. No. 06/062,749, now U.S. Pat. No. 4,231,642. From screen 12, all of the projected light is gathered to a vertical aerial exit slit 13 which linearly moves across the imaginary viewing window 14 in 1/60 second (i.e. equal to a TV field period) as scanner 5 makes one-half revolution in 1/60 second. Window 14 has diagonal corners identified by points A and B in FIG. 1. The aerial exit slit 13 occupies the entire height of window 14 where the window height is determined by the vertical scatter angle of screen 12.

My 3-D television projector system may be made to work properly with a picture modulator array of frames having the feature of light transmission as well as the reflection method described in this specification.

Figure 3:
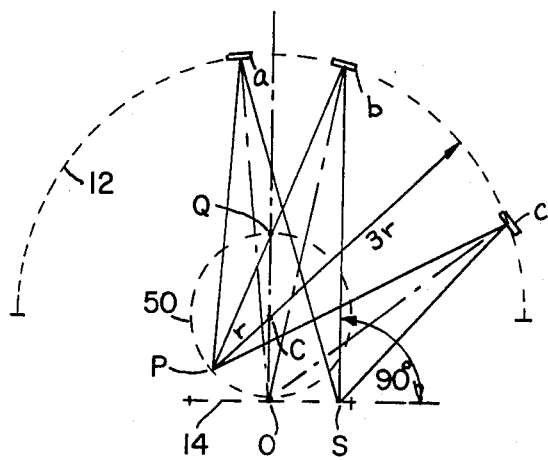
FIG. 3 shows a simplified plan view of the optical geometry of the 3-D television receiver optical scanner and screen according to my invention.

FIG. 2A and FIG. 2B show two detailed views of the embodiment of my stereoscopic television projector (shown in FIG. 1) according to my invention. FIG 2A shows a partial sectional view (taken through section A—A of FIG. 2B) of a side elevation of the television projector. FIG. 2B shows a partial plan view of the television projector with a portion cut away at the top right for clarity of the scanning mechanism. In FIG. 2A, element 20 of scanner 5 (as identified in FIG. 1) is connected to motor 3 by means of flange 21. The motor is fixed to the scanner's housing base 22 which is connected to at least three legs one of which is leg 23. The scanner housing is also made of sides 24 and 25, top 26, window 27, top 28 and 29. Located over the rotation centerline is baffle 30 held by spacer 31 to allow air in-take through a concentric hole in top 29. Air exits the circular scanner housing through a peripheral slot (not shown) and the scanner provides the function of fan rotor for lamp cooling and television picture scanner. For simplicity in explanation, only one half of the symmetrical scanner is shown in FIG. 2A. The scanner is symmetrical about the scan center line. The scanner is constructed of element 20, condenser lens housing 6 containing condenser lenses 32 and 33, the main scanner strut 34 which attaches to element 20 and lens housing 6. A first surface mirror 7 is attached to element 20. A polarizing filter 8 is attached to strut 34 over a hole in 34 sufficient for passage of condensing light from the omni-directional and fixed projection lamp 4. Projection lens bracket 35 is attached to strut 34 and lens barrel 36 attaches to 35. Lens barrel 36 contains an analyzer 37 and projection 38. The optical axis of 38 is normal to the scanning rotation axis and to projection screen 12 of FIG. 1 to avoid the problem of keystone distortion. The scanner also contains an aspheric mirror 11 to project the wide horizontal angle picture to screen 12. Screen 12 is beyond the view of FIG. 2A or FIG. 2B but is shown in FIG. 1 and FIG. 3. Lamp 4 is attached to fixed reference 29 by bracket 39. Fixed bracket 40 provides a support for the cone bracket 41. Cone bracket 41 is fixed with respect to reference 29 and contains a series of either flat or roof front surface mirror segments the quantity of which may vary but is selected to be 24 (by a criteria to be described later) and equal to the number of successive television frames acquired by the N-frames of memory in FIG. 1. The 24 successive television frames are modulated onto the CCDLCLV solid state surface depicted in FIG. 2A as 2. The mirror segments are collectively represented by 9 in FIG. 1 and FIG. 2A. The 24 mirror segments around the cone shape attached to part 41 can either be flat or 90 degree "roof" mirrors. The roof mirror principle is described in my U.S. Pat. No. 4,089,597 and again in a more detailed manner in a U.S. Pat. No. 4,113,367 titled, "Roof Reflective Polygon Scanning Apparatus" issued Sept. 12, 1978 to Ulrich M. Fritzler. The advantage of roof mirrors is that the light level does not reduce at the mirror borders to cause vertical black bars in the picture but instead the light level remains fixed to produce a continuous picture without the appearance of segmentation. The mirror segments 9 are radially staggered about the scan centerline of FIG. 2A with respect to the radial array of modulating image surfaces 2 such that they radially align at the center of the array of 24 frames (i.e. the 12th frame) but progressively move away from exact alignment from frame 11 toward frame 1 and from frame 13 toward frame 24 such that the greatest deviation from exact alignment occurs on frames 1 and 24. This "precession" of images is further described in my U.S. patent application Ser. No. 06/062,749 now U.S. Pat. No. 4,231,642. Precession of images assures that during reproduction of the scene, the original camera's optical axis (which photographed the scene) always tracks normal to the straight line determined by the projector's aerial slit locus. This relationship is shown in FIG. 3 (a plan view of the basic geometry of the projection system). The scan projector P moves in locus 50 at radius r. At radius 3r the segmented horizontally reflecting screen 12 with vertical scatter property is shown. Screen 12 is described in detail in my U.S. patent application Ser. No. 06/062,749 now U.S. Pat. No. 4,231,642. Only three of the several screen segments are shown in FIG. 3 at locations a,b and c. Each of these segments is normal to a line drawn to 0 on aerial slit scan line 14. Precession is such that the original camera's optical axis is projected along PQ independent of the position of P along the scan circle 50. Line PQb reflects to aerial exit slit S in a line bS which is normal to scan line 14. The precession of the 24 images in CCDLCLV array 2 with respect to the arc of 24 mirrors on the cone shape of part 41, will cause the geometry of FIG. 3 to automatically occur during each scan cycle.

Lens correction for projection onto deeply curved concaved screens is described in detail in U.S. Pat. No. 3,292,491, titled "Picture Projection Systems" that issued Dec. 20, 1966 to J. Hourdiaus.

Wiring of clock, power and video signals to the CCDLCLV assembly array represented by item 2 in FIG. 1 and FIG. 2A enters via a hole in top plate 29 of the scanner housing and a hole in bracket 39. The hole in plate 29 also provides inlet for lamp cord.

Figure 4:
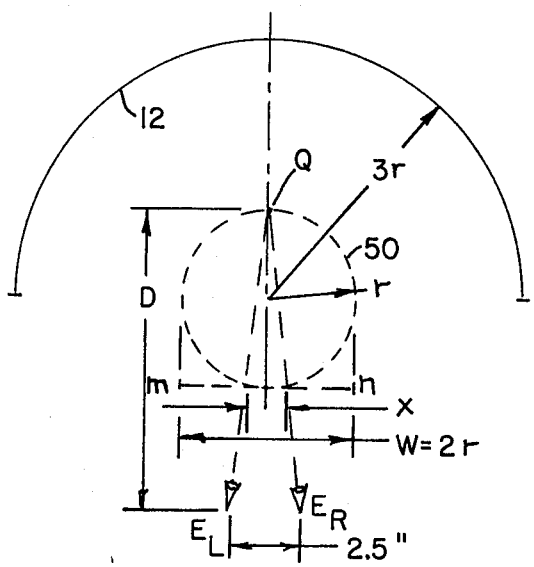
FIG. 4 shows a plan view of the projection geometry used to determine the quantity of television frames to be stored according to my invention.
Figure 5:
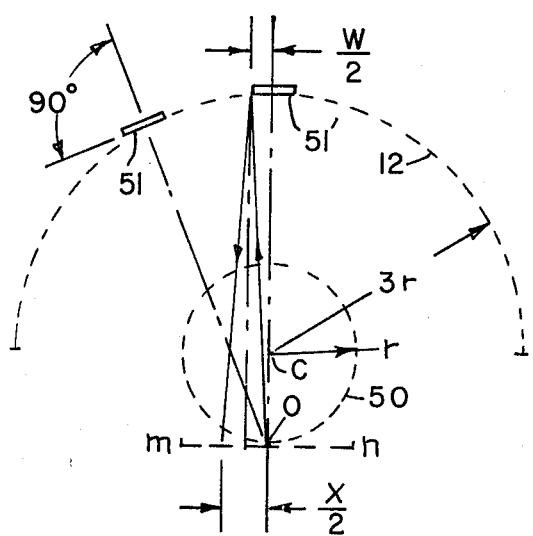
FIG. 5 shows a plan view of the projection geometry used to determine maximum size of screen elements according to my invention.

Television projector component sizes can be derived from certain assumptions and reference to geometric figures. FIG. 4 shows a plan view of the projection geometry for the 3-D TV projector according to my invention. It is assumed that the nearest spatial point that both eyes of an observer ($E_L$ and $E_R$) can focus on is at point Q on scan circle 50. Point Q is at distance D to observer's eyes. Using a 21 inch diagonal standard CRT television of the 1979 vintage as a size reference, the window mn width is 16.8 inches which means R=8.4 inches in FIG. 4. From proportional triangles, $2R/x = D/2.5 = 0.4D$ but $2R/x = N$ = number of pictures in the scan window mn. Therefore N=0.4D, but empirical data shows N=0.2D minimum. For a view distance of 10 feet, N=24 and x=0.7 inches. FIG. 5 shows how the vertical screen segments 51 and 51' have normals that pass through reference point O. It should be noted, however, that screen 12 is concentric with point C. Window mn is shown in front of scan circle 50. To find the maximum allowable width of the screen segment 51 or 51' the criteria is used that all screen incident rays from any given point along the scan path shall always be contained within the aerial exit slit width x. It can be shown from FIG. 5 that w=x/2=0.35 inches (maximum). There are 226 elements (minimum) in screen 12. Screen elements 51 or 51' can be made from horizontally brushed (to give vertical scatter property) stainless steel or other plastic surface as specified in my U.S. application for patent Ser. No. 06/062,749 now U.S. Pat. No. 4,231,642 my U.S. Pat. 4,089,597.

The description of optical scanning of adjacent picture frames and how they interleave to form the resultant stereoscopic scene is discussed in detail in my U.S. Pat. No. 4,089,597. Electronic scanning of pictures can produce unwanted net effects to the eye if not handled properly. Frames of film present all picture elements in parallel at the time of scan but television pictures occur on an element by element basis. The reason for selecting the CCDLCLV as the modulation media for my 3-D TV invention is that it has the property to store up a field and then parallel transfer the whole field so that decay is the same all over the picture. In my 3-D TV invention, picture viewing during scan and decay could bring unwanted (or "aliasing") effects to the viewer because what he sees is related to what is on the screen during the optical scanner interrupt period. Since the scan rate is one revolution in 1/30 sec, 120 degrees (i.e. the 24 picture array arc) is scanned in 1/90 second. This corresponds to scanning one frame in 1/2160 seconds or 463 microseconds. Since the horizontal line sweep period is 63.5 microseconds, only about 7 lines could be electronically scanned in a conventional TV projector while the optical scanner traversed the single frame on the 24 frame array. To circumvent the problems of non-uniform picture decay and partial scanning, I take the approach (in my invention) of complete field store and subsequent parallel transfer of the image to the display array. This of course requires that the optical scanner be timed to the TV sync signal. A synchronous motor is selected over a DC servomotor because of its quiet operation.

Any number of scanning facets can be adapted to my invention but the time interval occuring between successive scans of a television field should be 1/60 second. One facet would require a rotor scan speed of 3600 rpm whereas 2 facets would have a rotor scan speed of 1800 rpm. As the facets increase in quantity the rotor scan speed decreases but the complexity and cost of construction increases. A practical compromise for a home TV system would be 2 facets.

Figure 6:
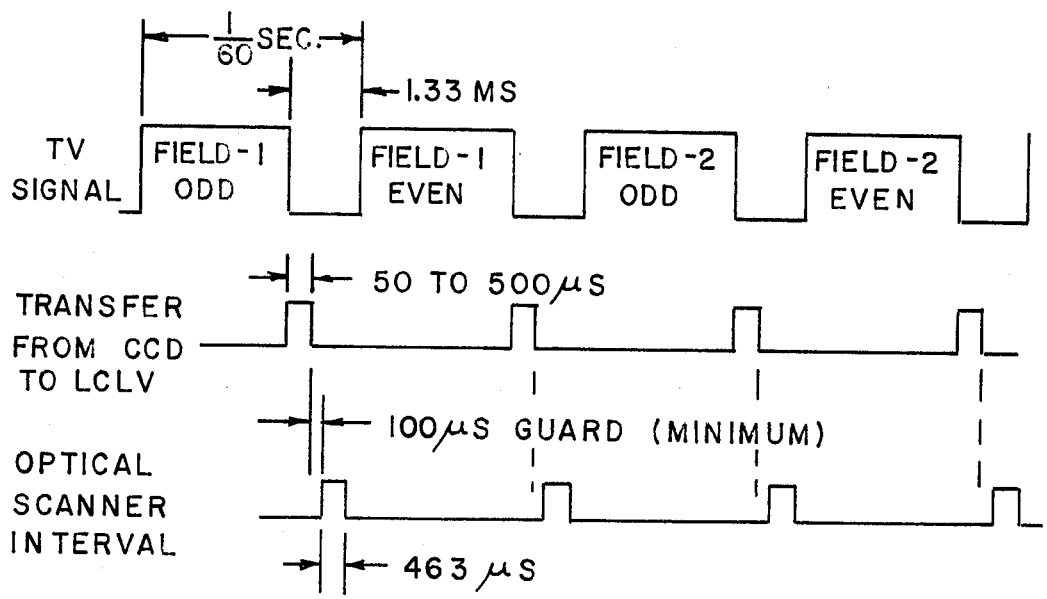
FIG. 6 shows timing waveforms for one of 24 images in the array according to my invention.

Commercial television uses 21 horizontal lines during vertical blank=1334 microseconds. The optical scanner scan period of 463 microseconds/field fits into this natural blank period very well. FIG. 6 shows the timing waveforms for the TV video signal, the interval allowed for the CCD to transfer a parallel field to the liquid crystal readout and the interval allowed for scan of the information according to my invention. During the field video time, the CCD is loaded with the entire field. At the completion of field video, the CCD transfers the entire field contents into the LCLV within 50 to 500 microseconds. A 100 microsecond guard is placed following the load sequence to allow for any sync problems with the optical scanner. Actually the optical scanner could scan the LCLV any time between the completed CCD transfer until the next transfer occurs, but should be as close to the transfer time as possible to assure a high contrast picture. The liquid crystal natural decay time constant will gradually fade the entire picture (as a unit).

Figure 7:
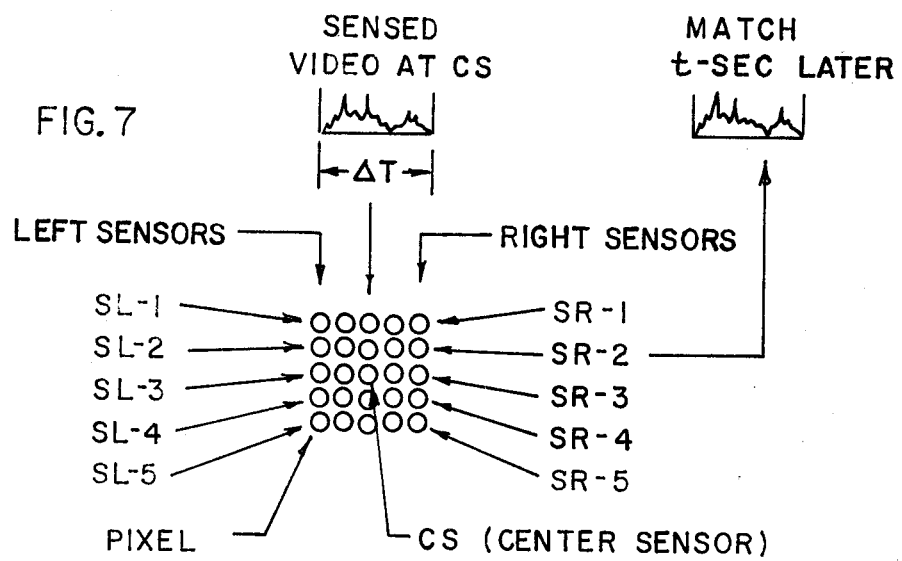
FIG. 7 shows a motion direction sensor array (showing a match for motion to the right).
Figure 8:
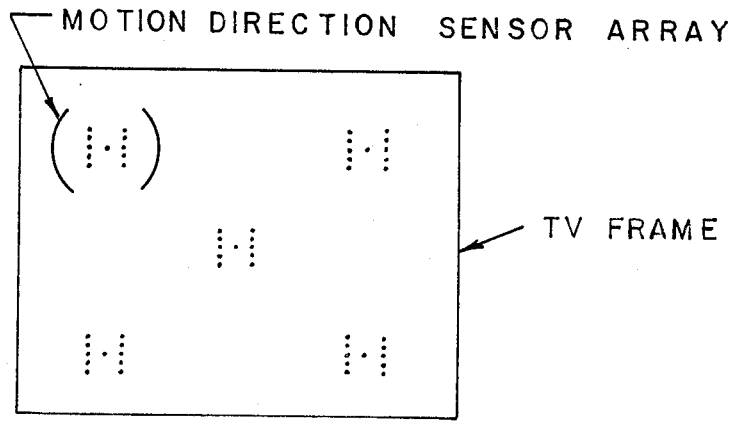
FIG. 8 shows five motion direction sensor arrays within a television frame storage media.

My invention is based on horizontal parallax caused by a relative motion (either left or right) between camera and scene. Either one can be in motion relative to the other. When an observer moves laterally with respect to the spatial images in the 3-D TV projector according to my invention, he will "see around" the images as he would around the real objects in a real scene. In my "film" 3-D movie system in U.S. patent application Ser. No. 06/062,749 now U.S. Pat. No. 4,231,642, the system was designed for relative motion in one horizontal direction. It was difficult to accomodate both left and right horizontal motions in the same viewer. It should be noted that strict horizontal motion is not required, but a "component" of horizontal motion is required to create the necessary parallax. In my new invention of 3-D TV without the need for optical aids at observer's eyes, the automatic adaptation to both left and right components of relative horizontal camera/scene motion is easily achieved. To accomplish this, motion direction sensing electronics is added to the equipment. FIG. 7 and FIG. 8 illustrate the concept used. One of the N-display memory readouts would contain 1 or more motion direction sensor arrays imbedded in the logic. FIG. 8 shows five of these sensor arrays within a TV frame. The details are shown in FIG. 7. CS is the center sensor. A few picture elements (pixels) to the right and to the left of CS are right and left sensors SR (1-5) and SL (1-5), respectively. All right and left sensors look for a matched signal sequence of a short sampled video period ($\Delta t$) sensed at CS a fraction of a second before. When the match occurs, the system knows the direction of relative camera/scene motion and can provide sequential switching preprogrammed commands to direct the scroll sequence of pictures arrayed over the arc of CCDLCLV's in the projector either from the right or from the left. The reason for including SL1 through SL5 and SR1 through SR5 in FIG. 7 instead of just using SL3 and SR3 along the horizontal line including CS, is that the vertical component of motion needs sensing flexibility as well as horizontal motion. With this arrangement, the scene could move laterally anywhere between a plus and minus 45 degree diagonal angle to the horizon across the television viewing screen and be sensed for proper left or right horizontal component.

A description of the CCDLCLV was published in the Proceedings of the Society of Photo-Optical Instrumentation Engineers Box 10, Bellingham, Wash.-98225-volume 128 for a presentation Sept. 27-29, 1977 in Huntsville, Ala. by Jan Grinsberg, titled "Liquid-Crystal Electro-Optical Modulators for Optical Processing of Two-Dimensional Data". Dr. Jan Grinberg, along with co-inventors Mike Waldner and Joe A. Jenny, obtained U.S. Pat. No. 4,227,201 on Oct. 7, 1980 entitled "Simple CCD Readout Scheme for Display". The CCDLCLV device can be split into two fundamental systems—the CCD portion and the LCLV portion. In the CCD portion, a serial television signal is converted into a parallel image array surface consisting of charges on the image array proportional to the television scene within the frame at that time. Paul K. Weimer has a U.S. Pat. No. 3,763,480 titled "Digital and Analog Data Handling Devices"—issued Oct. 2, 1973 and another U.S. Pat. No. 3,886,209 titled "Charge-Transfer Display System"—issued Feb. 11, 1975. These patents describe a means to achieve the above image array surface charges which are available for coupling into a LCLV. A basic CCD U.S. Pat. No. 3,654,499 was issued to George E. Smith on Apr. 4, 1972 and is entitled "Charge Coupled Memory with Storage Sites". The LCLV portion of the television readout device is described by Terry D. Beard in U.S. Pat. No. 3,824,002 titled "Alternating Current Liquid Crystal Light Valve" issued July 16, 1974 and in another U.S. Pat. No. 4,019,807 titled "Reflective Liquid Crystal Light Valve with Hybrid Field Effect Mode" issued Apr. 26, 1977 to Donald D. Boswell. The photoconductor and external illuminated image input described in the LCLV patents are replaced by the CCD array.

Color may be added to a liquid crystal display matrix array as described in U.S. Pat. No. 4,006,968 titled "Liquid Crystal Dot Color Display" issued Feb. 8, 1977 to Michael N. Ernstoff.

My 3-D TV invention will also operate properly if the controlling light modulator picture surface does not allow decay but holds either an entire field or frame on display from a single scene perspective during the optical scan period. Such a device is the TITUS optical relay for television projection described in U.S. Pat. No. 3,520,589 titled, "Optical Relay for Television Purposes" by Yves Angel and Gerard Marie which issued July 14, 1970. The use of this device in my invention would not be cost effective and would considerably increase the volume, weight and power compared with the CCDLCLV.

There are other solid state and tube type imaging surfaces which might be used to produce image array modulated light using either reflective or transmissive means. Liquid crystal material is sighted in this specification as one of those means.

Figure 9:
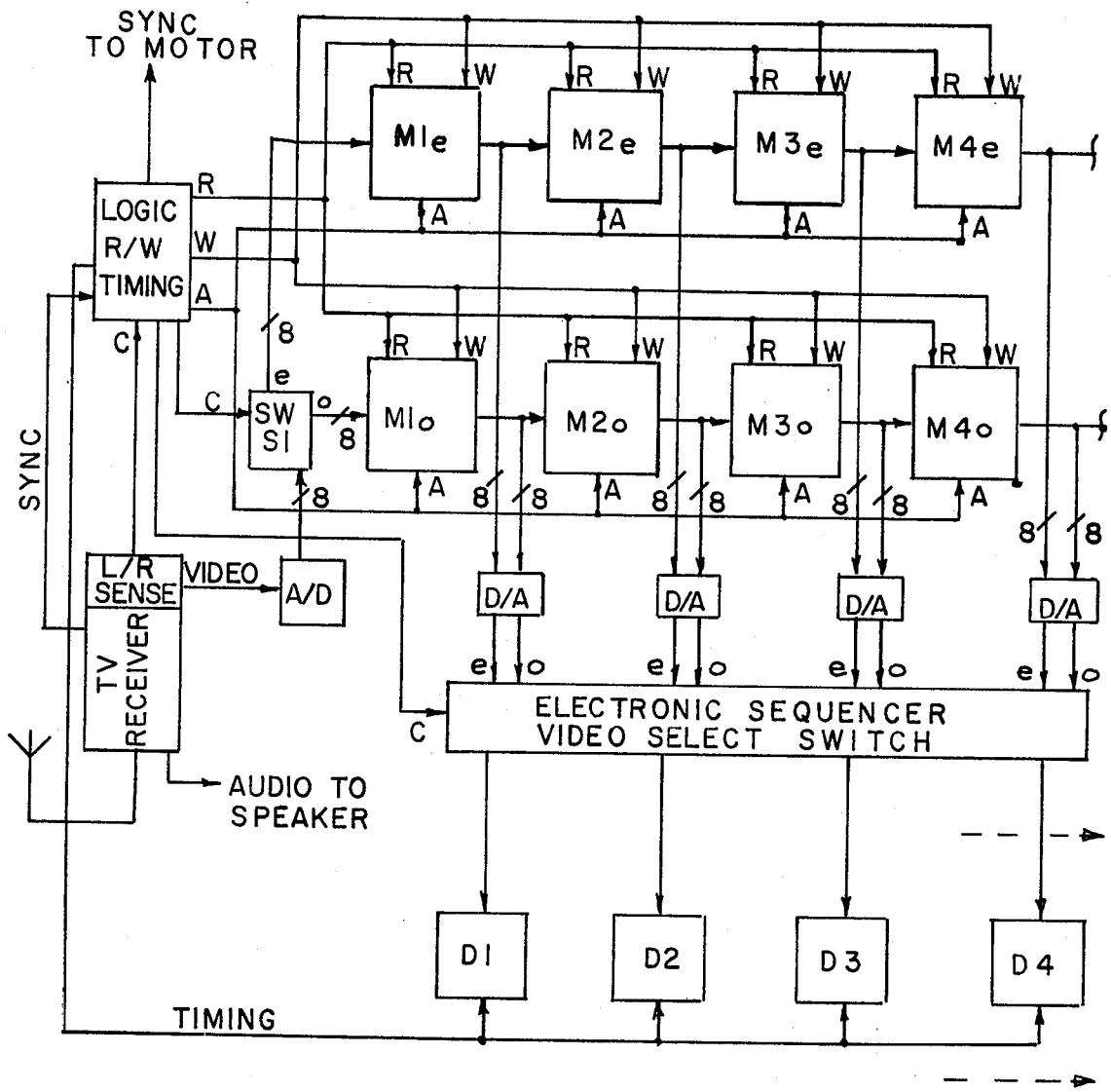
FIG. 9 shows a block diagram of a solid state memory for sequencing television fields through N-display matrix targets.

The memory used for storing up to N successive TV frames and providing a sequential scroll action of subsequent TV frames can be accomplished with a totally static system of random access memory (RAM). Other memory types might be selected but at this date RAM offers the fastest access compatible with television. To properly digitize a monochrome TV picture would require at least 8 bits per picture element (pixel) to give the proper grey shades to the picture. A TV frame with 0.25 million pixels would require 2 megabits storage per frame or 1 megabits per field. Since my invention suggests 24 frames for the 21 inch diagonal picture, 48 megabits of memory is required. This value would triple for color. The following description will discuss monochrome as color simply triples the storage circuits and the drawing can be simpler for ease of explanation. Table 1 lists the meaning behind each of the legends shown on FIG. 9, FIG. 10 and table 2 for brevity. In FIG. 9, each of the RAM memories (i.e. M) contain a field of TV. The TV signal is split into sync, audio and video by conventional and well known methods. The sync signal provides the reference timing for the control of switches, memory addressing, read and write commands to memory and reference signal to the servo motor control for the optical scanner. There are built-in delays to compensate for memory delays. The video signals are converted from analog to 8 bit digital and switched either to the odd or even memory chain depending on the TV waveform timing. When the memories are unloaded by read commands, the sequential video is converted from digital back to analog and the video signals are switched in proper odd/even sequence into the CCD portion of CCDLCLV displays $D_1$ through $D_N$ by switches controlled from the timing logic. The timing logic also provides serial clock and parallel transfer clocks for CCDLCLV operation for each of the 24 displays in accordance with previously reference U.S. patents.

TABLE 1

Figure 10:
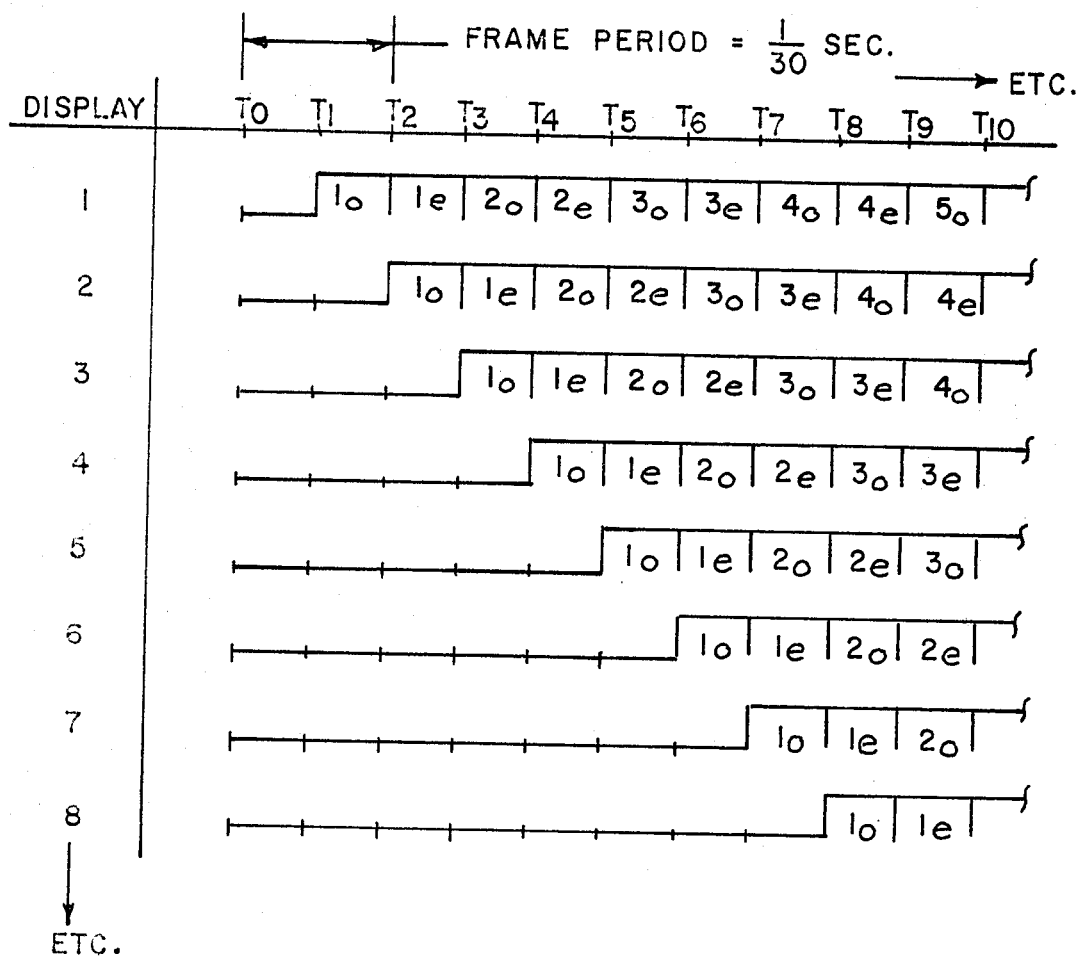
FIG. 10 shows the timing sequence for loading CCD's for displays.

| Legend for FIG. 9 and FIG. 10 and Table 2 |
| --- |
| M = random access memory (RAM) |
| $M_{1o}$ = memory contents for field-1 (odd) |
| $M_{1e}$ = memory contents for field-1 (even) |
| R = read |
| W = write |
| F = field (where there are 2 fields/frame of TV) |
| $F_{1o}$ = field-1 (odd) |
| $F_{1e}$ = field-1 (even) |
| $D_N$ = number of Nth display matrix CCDLCLV target |
| R/W = read/write |
| A = address |
| C = control |
| D/A = digital to analog converter |
| sw = switch |
| CCDLCLV = Charge Coupled Device Liquid Crystal Light Valve |
| e = even |

TABLE 1-continued

Legend for FIG. 9 and FIG. 10 and Table 2 o = odd

TABLE 2

Sequence of Operations for FIG. 9 Memories during the First Four TV Fields

| Period | | Field Period | Events During Period | |
|---|---|---|---|---|
| From | To | Number | From | To |
| T0 | T1 | 1 | $WF_{1o}$ | $M_{1o}$ |
| T1 | T2 | 2 | $WF_{1e}$ | $M_{1e}$ |
| | | | $RF_{1o}$ | $D_1$ |
| | | | $WF_{1o}$ | $M_{2o}$ |
| T2 | T3 | 3 | $WF_{2o}$ | $M_{1o}$ |
| | | | $RF_{1o}$ | $D_2$ |
| | | | $WF_{1o}$ | $M_{3o}$ |
| | | | $RF_{1e}$ | $D_1$ |
| | | | $WF_{1e}$ | $M_{2e}$ |
| T3 | T4 | 4 | $WF_{2e}$ | $M_{1e}$ |
| | | | $RF_{2o}$ | $D_1$ |
| | | | $WF_{2o}$ | $M_{2o}$ |
| | | | $RF_{1e}$ | $D_2$ |
| | | | $WF_{1e}$ | $M_{3e}$ |
| | | | $RF_{1o}$ | $D_3$ |

Odd memories are written while reading even memories. Even memories are written while reading odd memories. The electronic sequencer video select switch can load displays from either the left or right side depending on the direction of image motion translation sensed by the image direction sensor of FIG. 7 and FIG. 8.

Only four of the proposed 24 stages are shown for clarity in FIG. 9.

Table 2 shows the sequence of operations for FIG. 9 memories during the first four Television fields. Only four are shown for brevity and are representative.

FIG. 10 shows the timing sequence for loading CCDLCLV matricies for the first five TV frames and for 8 of the 24 matrix displays.

Figure 11:
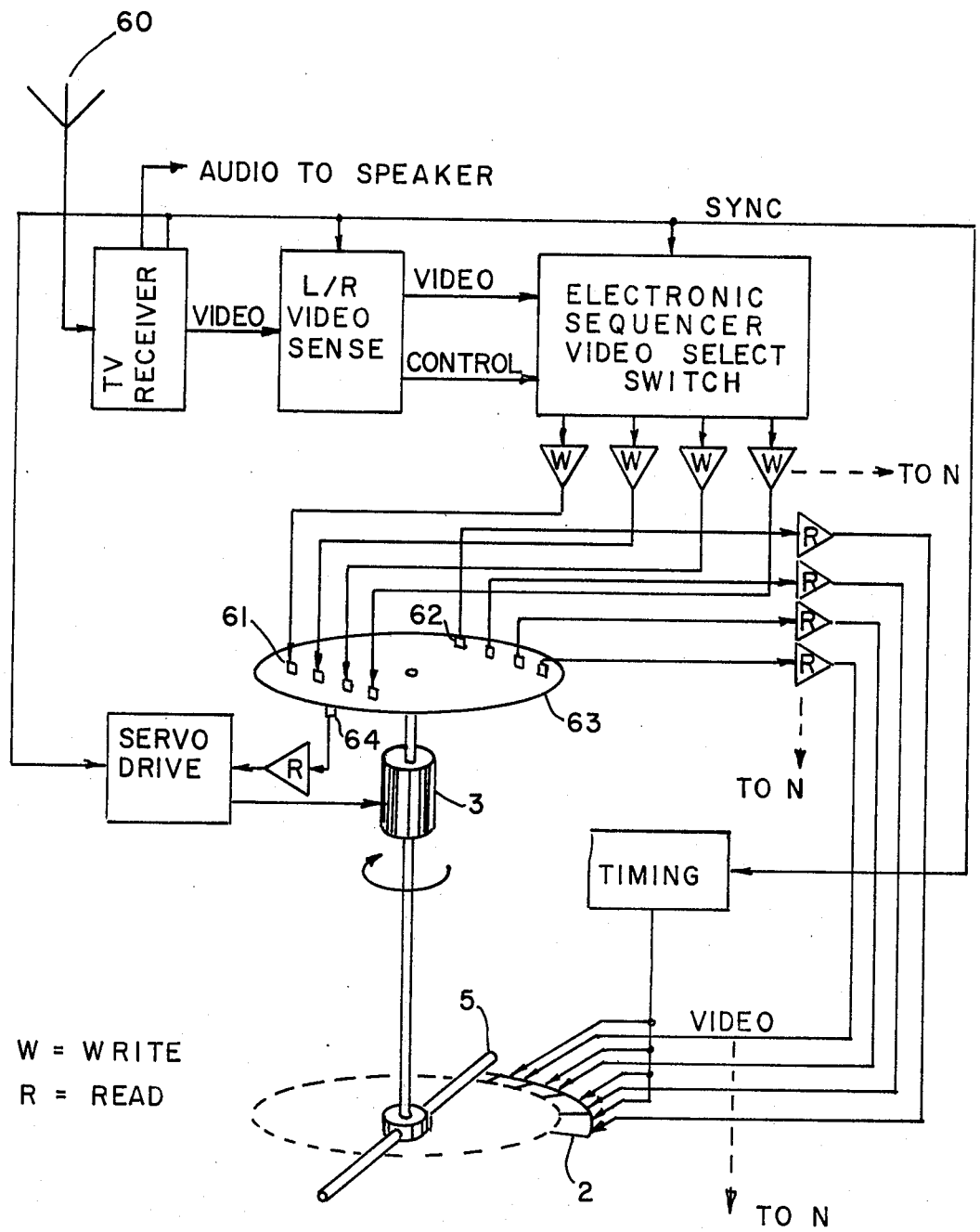
FIG. 11 shows a block diagram of an alternate method to obtain the 24 frame memory using magnetic disc technology.

Another embodiment of my 3-D TV receiver invention utilizes a magnetic disc to store the 24 frames instead of the all solid state memory approach previously described. The disc approach is shown in FIG. 11. The standard 2:1 interlaced raster scan display operates at 60 fields per second (30 frames per second) rate, thus the magnetic disc rotation is normally set at 3600 rpm or 1800 rpm. These disc speeds allow either a TV field or frame to be stored in one revolution of the disc. The two most common methods of turning the disc are an AC synchronous motor and a DC servo drive motor. Use of the AC synchronous motor is selected for my 3-D TV invention because of its quiet operation. The motor will allow the disc to be synchronized to the TV signal to assure that the CCDLCLV loading time falls close to the end of a field write period. For this reason, both disc and optical scanner are driven by the same motor.

The basic memory of a magnetic disc recorder is derived from the remanent magnetization properties of the disc coating. The data patterns recorded on the disc are established by fields set up from the write head as current is passed through its winding. During replay, as the read head passes through the transitions of this pattern, some of the flux goes through the low reluctance path of the head developing a voltage across the head winding proportional to the written data.

FIG. 11 shows a simplified block diagram of the record and playback system. Only 4 of the N write heads 61 and their corresponding read heads 62 and display frames 2 are shown. A careful study of timing for the disc based on two TV fields or one TV frame per disc track, will show a conflict if a single read/write head is used per track but no conflict if a separate read and write head is arranged 180 degrees apart on the disc for each of the required 24 tracks. Therefore an odd field may be written while an even field is read or vice versa. In FIG. 11, a standard TV antenna 60, receives a standard TV broadcast. A conventional TV receiver RF/IF, video amplifiers, sync stripper and sound discriminator separate video, sync and audio so that the video is sent to the direction sensor (described in FIG. 7 and FIG. 8 with text); sync is used to time the CCDLCLV array and motor; and the audio drives a conventional loud speaker. The switch signal for right-/left or left/right picture scan sequence across the 24 frame CCDLCLV array is sent to the Electronic Sequence Video Select Switch where a preprogrammed video switching sequence determines which picture of the series of 24 goes to which of the 24 display modulators. The magnetic disc 63 contains a timing track head 64 that provides timing feed back for motor 3 speed. The TV sync provides a motor speed reference plus control of the basic timing circuits for developing clock timing for the CCDLCLV array 2. Magnetic disc 63 and optical scanner 5 are shown connected together and driven by common motor 3. Optical scanner 5 is greatly simplified for ease of illustration. For a detailed description of scanner 5, reference FIG. 1, FIG. 2A and FIG. 2B and associated text.

Sequential TV frames are written onto the track numbers of the disc in the sequence shown in Table 3 while the track numbers are read from the disc into the N displays in the sequence shown in Table 4.

TABLE 3

Recording Sequence of TV Frames on Tracks of Magnetic Disc (4 of N shown)

| | Tracks | | | | |
|---|---|---|---|---|---|
| N------ | 4 | 3 | 2 | 1 | |
| | 4 | 3 | 2 | 1 | ↑ |
| | 4 | 3 | 2 | 5 | ↑ |
| | 4 | 3 | 6 | 5 | ↑ |
| | 4 | 7 | 6 | 5 | ↑ |
| | 8 | 7 | 6 | 5 | TV Frame Numbers |
| | 8 | 7 | 6 | 9 | ↓ |
| | 8 | 7 | 10 | 9 | ↓ |
| | 8 | 11 | 10 | 9 | ↓ |
| | 12 | 11 | 10 | 9 | ↓ |

TABLE 4

Reading Sequence of TV Frames From Tracks of Magnetic Disc into CCD Matrices of Displays- (4 of N Displays shown)

| | Displays | | | |
|---|---|---|---|---|
| $D_N$---- | $D_4$ | $D_3$ | $D_2$ | $D_1$ |
| | | | | 1 |
| | | | 1 | 2 |
| | | 1 | 2 | 3 |
| | 1 | 2 | 3 | 4 |
| | 2 | 3 | 4 | 5 |
| | 3 | 4 | 5 | 6 |
| | 4 | 5 | 6 | 7 |
| | 5 | 6 | 7 | 8 |
| | 6 | 7 | 8 | 9 |
| | 7 | 8 | 9 | 10 |
| | 8 | 9 | 10 | 11 |

In a similar manner to magnetic disc, magnetic tape with at least a single record head and N read heads and with proper switch control logic, could provide storage for N frames and control multiple displays as required to provide 3-D TV.

It should be noted that the requirement of relative lateral motion between camera and scene can be eliminated if the transmission bandwidth is allowed to go up. Transmission of 24 channels simultaneously (from 24 stationary TV cameras) would eliminate the need for this relative motion. An alternate would be to transmit 3 channels (say the first picture, twelfth picture and the twenty fourth picture) while using real time computer graphics processing to synthesize the "in-between" views (at the receiver) which were not transmitted. These two approaches would allow "lip-synchronized" 3-D TV of scenes stationary with respect to the TV camera. The penalty, of course, is increased transmission bandwidth.

Having thus fully described my invention and the manner in which it is to be practiced, I claim:

1. A method of stereoscopically reproducing standard television signals for observation by plural observers without the need for visual aids at the eyes of said observers, comprising the steps of:

providing relative lateral motion between television camera and scene;

acquiring a number of sequential television frames or fields on an array of images;

scanning said image array by a scan projector having one or more identical facets;

causing any image of said image array to store a whole television field or frame during the scan interval by any single facet of said scan projector;

causing any image in said image array to advance to the next sequential television field or frame during the period between adjacent facets of said scan projector;

sensing the direction of said relative lateral motion between said camera and scene to assure stereoscopic viewing;

sequentially projecting said array of images onto a semi-specular screen, said scan projector being positioned during projection at successive positions about the arc of a projection circle, said screen being of larger radius compared with said projection circle;

causing said screen to vertically scatter and horizontally reflect light from said screen to intersect on a line essentially tangent to said projection circle;

causing said intersected light to move along said line;

causing said scan projector interval between adjacent facets to be within the period of persistence of vision of observers.

2. A construction for displaying stereoscopic television to observers situated in front of the viewing screen of said construction, said construction including:

a television antenna and receiver to generate audio for a loud speaker, video for storage in a multiple frame store, sync for timing a synchronous motor connected to a scan projector and timing for an image array; an image direction sensor to retain a stereoscopic scene; a fixed lamp to illuminate said image array sequentially through optics mounted on each facet of said scan projector, a light polarizer and analyzer on either side of said image array, said analyzer to sense the change in picture element polarization within said image array; an array of roof mirrors to reflect said array images through projection optics, said projection optics mounted on said scan projector; a stationary concaved semi-specular viewing screen to receive said projected images and return the incident projected light to a transversely moving aerial exit slit.

* * * * *